US005415318A

United States Patent [19]

Lewis

[11] Patent Number: 5,415,318

[45] Date of Patent: May 16, 1995

[54] CONTINUOUS FASTENER FEED SYSTEM

[76] Inventor: Marlan M. Lewis, P.O. Box 803, Forney, Tex. 75126

[21] Appl. No.: 127,325

[22] Filed: Sep. 27, 1993

[51] Int. Cl.[6] .............................................. B65G 59/08

[52] U.S. Cl. .......................................... 221/1; 221/25; 221/30; 221/70; 221/107; 221/224; 221/268

[58] Field of Search ................... 221/1, 25, 26, 30, 31, 221/32, 66, 70, 103, 104, 107, 224, 8, 239, 268, 312 R, 156

[56] References Cited

U.S. PATENT DOCUMENTS

| | | | |
|---|---|---|---|
| 2,253,644 | 8/1941 | Naugler | 221/239 X |
| 2,385,521 | 9/1945 | Mead | 221/239 X |
| 2,843,069 | 7/1958 | Halbreich | 221/239 X |
| 2,891,698 | 6/1959 | Kottas | 221/285 X |
| 3,123,251 | 3/1964 | Schneider | 221/156 |
| 3,189,220 | 6/1965 | Mullaney . | |
| 3,494,311 | 2/1970 | Hopkins | 221/156 X |
| 4,197,974 | 4/1980 | Morton et al. . | |
| 4,314,628 | 2/1982 | Calbert et al. | 221/312 R X |
| 4,323,184 | 4/1982 | Maurer . | |
| 4,326,661 | 4/1982 | Maurer et al. . | |
| 4,599,026 | 7/1986 | Feiber et al. | 221/103 X |
| 4,746,046 | 5/1988 | Frye . | |
| 4,867,367 | 9/1989 | Kennedy . | |
| 5,065,930 | 11/1991 | Kennedy . | |
| 5,083,694 | 1/1992 | Lemos . | |
| 5,154,316 | 10/1992 | Holcomb et al. | 221/239 X |

*Primary Examiner*—Cheryl L. Gastineau
*Assistant Examiner*—Dean A. Reichard
*Attorney, Agent, or Firm*—Jenkins & Gilchrist

[57] ABSTRACT

A staple feed system utilizing an inclined staple feed ramp for axial loading of staples into a staple gun under the influence of gravity. The inclined feed ramp includes an inclined upper linear portion, an upwardly curving arcuate central portion, and a horizontal lower portion permitting the continuous feed of staples beneath the actuation mechanism of the staple gun while the staple gun is disposed in a generally horizontal position. The angulated feed system may be utilized with staple racks comprising multiple staples adhered one to the other. The arcuate ramp is sized to permit the smooth movement of staples thereon, allowing the transfer of gravitational force to the staples contiguous the actuation mechanism for the uninterrupted feeding of staples thereto.

23 Claims, 2 Drawing Sheets

CONTINUOUS FASTENER FEED SYSTEM

BACKGROUND OF THE INVENTION

1. Field of the Invention

The present invention relates to fastening systems and feed apparatus therefor and, more particularly, to a continuous staple feed system for a staple gun fastener.

2. History of the Prior Art

For many years, fastening tools have been used for rapidly fastening together structural members such as wooden studs, wooden sheets, and the like. These fastening tools have found widespread popularity in the building and manufacturing industries because they provide an economical means for assembling a wide variety of articles. Two of the most common forms of fastening tools are nail guns and staple guns that utilize "racks" of fastening elements such as nails or staples. The racks are fed into the gun and aligned beneath an actuation hammer for discharge of individual elements therefrom. In many manufacturing set-ups, it is preferable that the gun be disposed in a horizontal orientation, parallel to the surfaces of structural members to be fastened. Structural members may move beneath the gun on a conveyor belt, so that as nails or staples are discharged vertically from the gun, they penetrate the structural members perpendicular to their surfaces.

Generally, the type of construction and the size of members to be fastened are the determining factors as to which type of automatic fastener system is utilized. In residential construction, for example, the most common type of fastener is the nail which is often discharged from a pneumatic gun which drives the nail through wooden studs and/or sheets of wood, gypsum, or the like to effect an assembly for structural and functional use. When less structural support is needed, or when the assembled sheets are thinner in size, U-shaped staples are often utilized. Staple guns provide the same efficient operation as nail guns by discharging individual staples from multiple staple racks that are fed into the staple gun.

Existing automatic fastener guns have serious problems with their systems for feeding fastener elements into the guns. During high speed operation of such fastener guns, it is of critical importance that there be an uninterrupted supply of fastener elements. During the feeding process, the nail or staple must be positioned with precision beneath the actuation head of the fastening gun. Only when properly positioned will the fastening member be discharged from the gun in the proper orientation and with sufficient force to drive it through the members to be fastened.

When the fastening element is not properly aligned beneath the actuation head, problems such as jamming occur. A jammed gun can cause undue delay in operation, lost efficiency, wasted manhours, and often results in damage to the fastening gun with its attendant cost of repair. Jamming often occurs because of improper feeding of the fastening elements to the gun itself. Because the fastening elements are generally provided in racks which maintain the alignment of the individual elements within each rack, such jamming problems rarely occur in midrack. If a constant feed force is maintained on the rear of the rack, the rack smoothly advances, and individual fasteners are properly discharged from the gun.

When additional racks of fastening elements must be added, however, it is generally necessary to remove the feed force upon loaded racks to allow additional racks of fastening elements to be loaded. Once the racks are loaded, the feed forces, usually generated by a spring, are then restored. In addition to causing a delay in the operation of the gun, this "intermittent" feed force operation causes numerous other problems, especially at the transition points between racks. First, there can be inconsistencies in the movement of the fastening elements within the gun, causing a fore-and-aft misalignment under the actuation head. Second, the racks of fastening members can become skewed when the feed force is reapplied, causing additional misalignment problems. These are but a few of the problems that have plagued the automatic fastener industry.

For these and other reasons, a variety of improvements have been set forth, which generally address methods of providing a continuous feed of fastening members to the gun. Some of these approaches are set forth and shown in various U.S. patents. For example, U.S. Pat. No. 3,189,220 to Mullaney teaches a staple feed system that is transverse to the movement of the staples through the gun. Similar systems are seen in nail gun feed systems.

U.S. Pat. No. 4,326,661 to Maurer et al teaches a nail gun having a standard nail gun feed, the nails being angulated relative to the feed track. The use of angulated nails is clearly accepted in the industry, but it has not to date been deemed acceptable for staples.

U.S. Pat. No. 4,746,046 to Frye teaches a motor-driven feed for staples supplied in racks. Although the feed applies constant pressure, it requires a separate, external feed system and power source.

U.S. Pat. No. 5,065,930 to Kennedy teaches an external, pneumatically operated spiral feeding system. The spiral feeding system shown in Kennedy is particularly adapted for stapling lattices, pallets, fence panels and the like which move on a conveyor belt past a permanently mounted, stationary fastener gun.

As seen by the existing systems discussed above, automatic feeding of both staples and nails has received wide-spread attention. To date, all such systems utilize motorized feeds with their attendant reliability problems, expenses, and complications. It would be advantageous, therefore, to have a single, reliable automatic feeding system for such fastening elements that provides a gravitational feeding system which utilizes gravitational forces to feed the fastening members to a staple gun that may be disposed in a horizontal relationship relative to the members to be fastened. The present invention provides such a system by providing an in-line, arcuate feed track aligned to present fastening members in a horizontal position beneath the actuation head of a fastener gun, in a reliable and effective manner using only the force of gravity.

SUMMARY OF THE INVENTION

In one aspect, the present invention includes a system for feeding staples to a horizontally disposed staple gun having a vertically disposed actuator head. The staple feeding system comprises a means for sequentially storing a plurality of staples. The storing means may comprise a feed track having a width adapted for receiving racks of staples thereupon in slidable engagement therewith. The system also includes a means for orienting the stored sequence of staples so that the staples automatically advance to a lead position due only to the force of gravity. The orienting means may include a central upwardly curving arcuate portion of the feed track, an upwardly angled linear upper portion of the feed track connected to one end of the central arcuate portion, and a lower horizontal portion of the feed track connected to the other end of the central arcuate portion. The system also includes a means for positioning the staple gun so that the lead position of the advancing sequence of staples is a position beneath the vertical actuator head. The positioning means may include a horizontal base to which the feed track is attached, and a clamp for securing the staple gun to the horizontal base in a position straddling the feed track and causing the advancing staples to pass beneath the vertical actuator head.

In another aspect, the invention includes the use of a relatively narrow feed track adapted for receipt of the generally u-shaped staples thereon. The staples are preferably provided in racks which rest upon and engage the side walls of the track in a mating relationship therewith. The side walls of the track are sufficiently narrow to permit the free movement or sliding of the staples therealong, but are sufficiently wide to prevent the staples from becoming skewed upon the track. The angulation of the track is provided with an arcuate portion having a radius at certain points on the order of 15 inches. The radius of curvature may, of course, vary depending on the size of the staple.

In another aspect, the invention includes a method of feeding staples to a staple actuator of the type wherein the actuator is positioned above the staples for engagement of individual ones thereof and the discharge of the staples therefrom. The staple feeding method first comprises the step of forming a staple feed track having a lower horizontal portion, a central upwardly curving arcuate portion, an upwardly angled linear upper portion, and a width adapted for receiving racks of staples thereupon in slidable engagement therewith. The method also includes mounting a means for retaining the staples on the feed track during the movement of the staples therealong. The step of providing a retaining means may include providing a guard rail and disposing the guard rail above the upwardly curving arcuate portion and above the upwardly angled linear portion a sufficient distance to facilitate the passage of staples therebeneath while maintaining the passage of staples on the feed track. The method also includes securing the staple actuator to the feed track, and loading staples onto the feed track in sufficient quantity to permit a plurality of staples to extend upwardly along the upwardly angled linear portion, thereby utilizing the pull of gravity to urge the staples disposed in the lower horizontal portion of the feed track to move beneath the actuator.

BRIEF DESCRIPTION OF THE DRAWINGS

For a more complete understanding of the present invention and for further objects and advantages thereof, reference may now be had to the following description taken in conjunction with the accompanying drawings in which.

DETAILED DESCRIPTION

Figure 1:
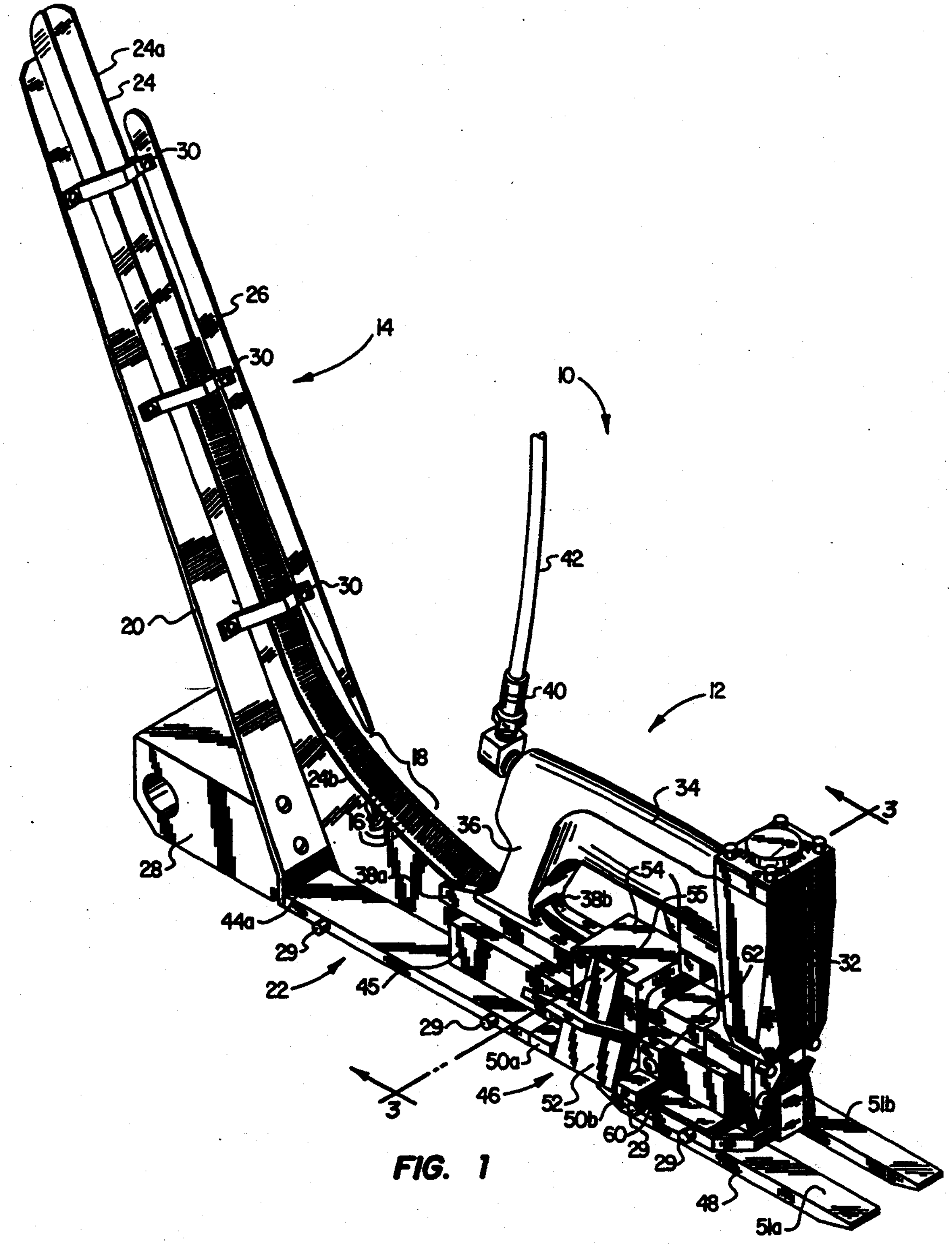
FIG. 1 is a perspective view of a continuous feed fastening system constructed in accordance with the principles of the present invention.

Referring first to FIG. 1 there is shown a perspective view of a continuous feed fastening system 10 constructed in accordance with the principles of the present invention. The fastening system 10 includes a staple gun 12 and a continuous feed ramp 14 secured thereto. The continuous feed ramp 14 is supplied with a plurality of U-shaped fastener elements, or staples, 16 supplied in elongate racks 18 and mounted thereon. The racks 18 comprise sequentially aligned and bundled fastening elements that are adhered one to the other for purposes of handling and feeding to such a staple gun. With the present invention 10, the racks 18 are continuously supplied to the staple gun 12 as long as new racks 18 are positioned upon the upper portion of the ramp 14 mounted thereto.

Still referring to FIG. 1, the feed ramp 14 includes an inclined support member or frame 20, a horizontal base 22, a feed track 24 and a guard rail 26. The frame 20 extends downwardly and is secured to a binding block 28 disposed adjacent to the horizontal base 22. The feed track 24 is perpendicular to the frame 20 and the base 22, and includes a linear upper portion **24*a*, an arcuate middle portion 24*b*, and a horizontal end portion 24*c* (FIGS. 2 and 3) that engages, and is secured to, the base 22 by a plurality of bolts 29. The guard rail 26 is principally disposed above, and spaced slightly from, the linear upper portion 24*a* of the feed track 24, and is secured to the frame 20 by three braces 30*a*, 30*b* and 30*c***.

The staple gun 12 is disposed above, and rests on, the horizontal base 22 and, includes an actuation mechanism or head 32, a body or handle 34, a leg 36 and two feet **38*a* and 38*b*. The handle 34 extends from the upper portion of the head 32 to the upper end portion of the leg 36, and the leg extends from the end portion of the handle 34 to the feet 38*a*, and 38*b*. Further, the feet which extend horizontally from the lower end portion of the leg 36 to the lower end portion of the head 32 are arranged in such a manner as to straddle or sit astride either side of the horizontal end portion 24*c* (FIGS. 2 and 3) of the feed track 24. An air fitting 40 is disposed on the posterior portion of the handle 34 and is connected to an air hose 42 for the pneumatic operation of the head 32 of the staple gun 12**, as will be described below.

Figures 2, 3:
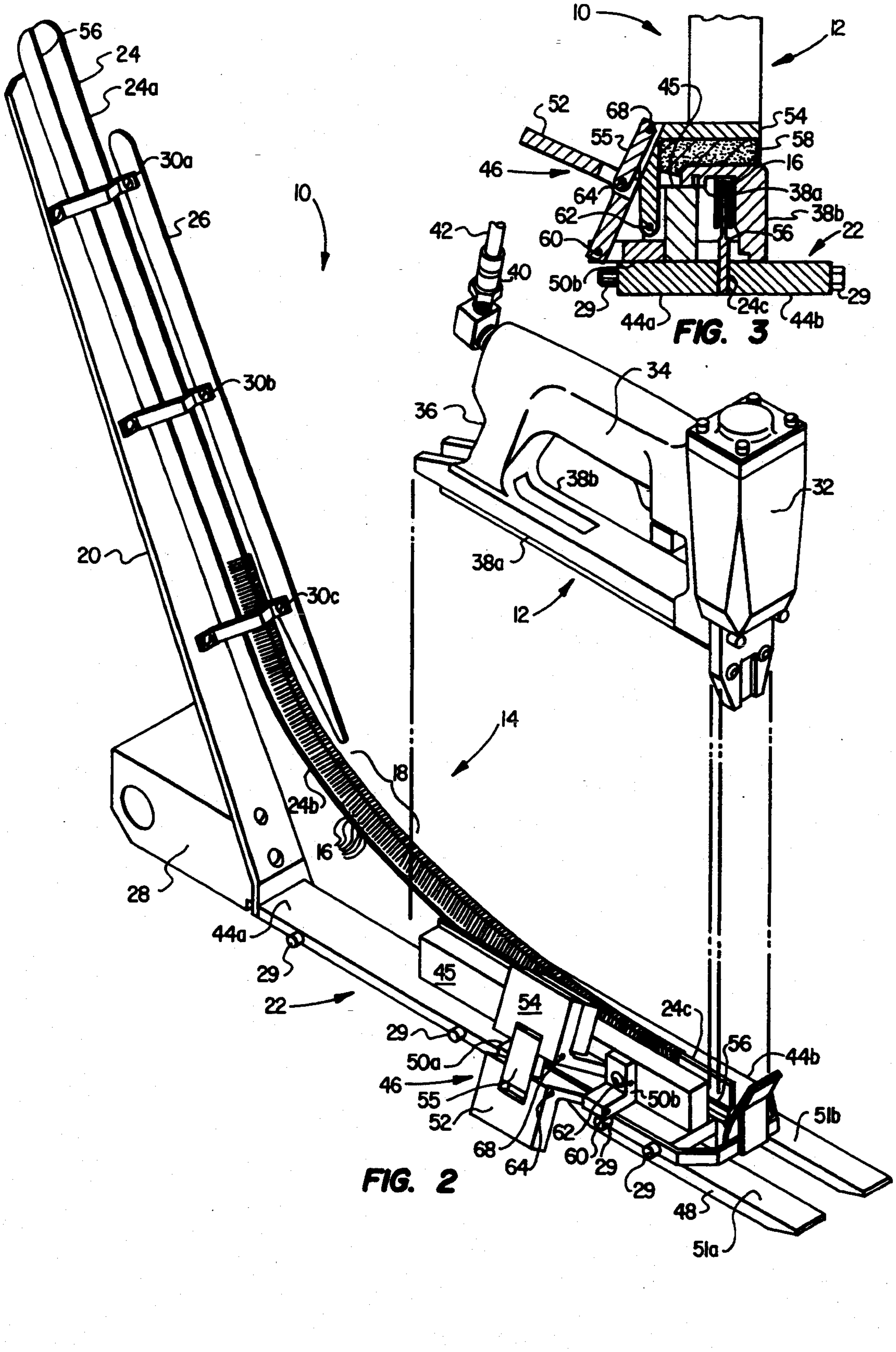
FIG. 2 is a partially exploded perspective view of the fastening system of FIG. 1.
FIG. 3 is an end elevational, cross sectional view of a staple disposed upon a continuous feed ramp with a staple gun in the locked position as shown in FIG. 1.

Still referring to FIG. 1, the horizontal base 22 includes two horizontal support members **44*a* and 44*b*, one of which is shown in FIG. 1 by reference numeral 44*a*, a mounting block 45, a clamp assembly 46, and a fork 48. The two horizontal support members 44*a* and 44*b* are adjacent to the binding block 28 and extend to the end of the horizontal end portion 24*c* of the feed track 24, as shown in FIG. 2. Further, the two horizontal support members 44*a* and 44*b* are disposed astride the horizontal end portion 24*c* of the feed track 24 and are suitably attached to the feed track 24 so as to provide vertical support to same. The mounting block 45 is disposed on the upper surface of the horizontal support member 44*a* and is suitably attached to same by two L-shaped braces 50*a* and 50*b*, as will be described. The fork 48 consists of two prongs 51*a* and 51*b* that are disposed on the lower surfaces of the horizontal support members 44*a* and 44*b***, respectively.

The clamp assembly 46 includes an L-shaped lever 52, an L-shaped jaw 54, and a joining member 55 to communicate forces therebetween. The lever 52 and jaw 54 are disposed between the braces 50*a* and 50*b*, and are attached thereto by pins 60 and 62 to provide for pivotal motion, as will be described below.

FIG. 2 is a partially exploded perspective view of the continuous feed fastening system 10 illustrating the removal of the staple gun 12 from the feed ramp 14. As can be better appreciated in FIG. 2, the feed track 24 extends from the upper end portion of the inclined support member 20 to the end of the horizontal base 22. Further, the arcuate middle portion 24*b* of the track 24 provides for a smooth transition from the linear upper portion 24*a* to the horizontal end portion 24*c* of the track. For purposes of example only, an arcuate section 24*b* having a radius on the order of 15 inches has been found acceptable for staples which have a length of 5/8 inches, a width of 3/16 inches and a thickness of 3/64. Other radius dimensions could, of course, be used. Likewise, staple size will vary for separate applications. Also, the track 24 varies in thickness so as to define a shoulder 56 for more stable transport of the staples 16.

Referring to FIG. 3, there is shown an end elevation cross-sectional view of the fastening system 10 of the present invention. The fastening system 10 includes the horizontal base 22, the feed track 24, the clamp assembly 46 and the staple gun 12. The horizontal base 22 includes the horizontal support members 44*a* and 44*b* which are disposed on either side of the lower end portion 24*c* of the feed track 24, and are suitably secured to the track by one of the bolts 29. The base 22 also includes the block 45 disposed on the upper surface of the horizontal support member 44*a* and secured thereto by the braces 50*a* and 50*b* (FIGS. 1 and 2). The staples 16 rest on the upper surface of the feed track 24, the thickness of which varies vertically so as to define the shoulder 56. The feet 38*a* and 38*b* of the staple gun 12 straddle either side of the feed track 24. The foot 38*a*, which is shorter than foot 38*b*, rests on the upper surface of the block 45, while the foot 38*b* extends down to the horizontal member 44*b*.

The clamp assembly 46 includes the L-shaped lever 52, the L-shaped jaw 54, and a joining member 55. In the locked position as shown in FIG. 3, the lever 52 resembles an L-shaped member that has been rotated counter clockwise by 135° while the jaw 54 resembles an L-shaped member that has been rotated clockwise by 90° so that one leg of the jaw 54 extends over the feet 38*a* and 38*b* of the staple gun 12 to secure same. A block 58 of elastic material is disposed between the jaw 54 and the feet 38*a* and 38*b* to communicate compressional force therebetween. The lower end portion of the lever 52 is disposed between the braces 50*a* and 50*b*, and attached to the lower, outboard portion of the braces by a pin 60 that operates as a fulcrum for the lever. Similarly, the lower end portion of the jaw 54 is disposed between the braces 50*a* and 50*b*, and attached to the upper, in-board portion of the braces by a pin 62 that operates as a fulcrum for the jaw 54. A notch is formed in the apex of both the lever 52 and the jaw 54 to receive the joining member 55. The ends of joining member 55 are suitably attached to the apex of the lever 52 and the jaw 54 by two pins 64 and 68, respectively, to enable pivotal motion between the lever, jaw and the joining member 55. As clamps, such as the clamp assembly 46, are well understood in the art, it is not described further.

In operation of the fastening system 10, compressed air is supplied to the staple gun 12 by the air hose 42 from a suitable source, such as an air compressor (not shown) for the pneumatic operation of the gun. Lumber such as slats, ribs, lattice work or the like is urged under the fastening system 10 by a suitable means, such as a conveyer belt (not shown), and guided by the prongs 51*a* and 51*b* of the fork 48. Periodically, the head 32 of the staple gun 12 is actuated and a staple 16 is driven into the lumber. As the staples 16 are consumed, the racks 18 travel downwardly along the feed track 24 under the influence of gravity and are prevented from vibrating off of the track by the guard rail 26. A plurality of racks 18 are disposed along the linear upper portion 24*a* and the arcuate middle portion 24*b* to provide sufficient force to continuously urge the racks disposed along the horizontal end portion 24*c* under the head 32.

The system and method of the present invention has several advantages over the prior art. For example, the gravitational feed system provides a continuous and uninterrupted supply of fastening elements to the staple gun, when compared to the use of a spring loaded feed system. This provides the further synergistic effect of increased reliability with the reduction of gun jamming with the associated cost of delayed operation and repair. Also, the gravitational feed system has a lower production cost and increased reliability when compared to motor-driven feed systems. That is, a gravitational feed system has no moving parts to wear out or break down. Consequently, the gravitational feed system has significantly lower costs of maintenance.

A latitude of modification, change and substitution is intended in the foregoing disclosure and in some instances some features of the invention will be employed without a corresponding use of other features. Numerous modifications and variations are possible and will be apparent to those of ordinary skill in the art in view of the teachings above. The present disclosure and the following claims are intended to cover all such modifications and variations.

What is claimed

1. A staple feeding system comprising:
- means for sequentially storing a plurality of staples;
- means for orienting said stored sequence of staples so that said staples automatically advance to a lead position due only to the force of gravity;
- means for dispensing and activating one of said plurality of staples; and
- means for positioning said means for dispensing and activating so that said lead position of said advancing sequence of staples is a position beneath said means for dispensing and activating.

2. The system of claim 1 wherein the means for sequentially storing a plurality of staples includes a feed track having a width adapted for receiving racks of staples thereupon in slidable engagement therewith.

3. The system of claim 2 wherein the means for orienting said stored sequence of staples so that said staples automatically advance to a lead position due only to the force of gravity includes:
- a central upwardly curving arcuate portion of said feed track having first and second ends;
- an upwardly angled linear upper portion of said feed track connected to said first end of said central arcuate portion; and
- a lower horizontal portion of said feed track connected to said second end of said central arcuate portion.

4. A system for feeding staples to a horizontally disposed staple gun having a vertically disposed actuator head, said system comprising:

means for sequentially storing a plurality of staples, including a feed track having a width adapted for receiving racks of staples thereupon in slidable engagement therewith;

means for orienting said stored sequence of staples so that said staples automatically advance to a lead position due only to the force of gravity, including:

a central upwardly curving arcuate portion of said feed track having first and second ends;

an upwardly angled linear upper portion of said feed track connected to said first end of said central arcuate portion; and a lower horizontal portion of said feed tract connected to said second end of said central arcuate portion; and means for positioning said staple gun so that said lead position of said advancing sequence of staples is a position beneath said vertical actuator head, including:

a horizontal base to which said feed track is attached; and a clamp assembly for securing said staple gun to said horizontal base in a position straddling said feed track and causing said advancing staples to pass beneath said vertical actuator head.

5. A method comprising the steps of:

sequentially storing a plurality of staples;

orienting said stored sequence of staples so that said staples automatically advance to a lead position beneath a vertical actuator head of a staple gun due only to the force of gravity; and actuating said actuator head of said staple gun to discharge and activate one of said staples.

6. The method of claim 5 wherein the step of sequentially storing a plurality of staples includes constructing a feed track having a width adapted for receiving racks of staples thereupon in slidable engagement therewith.

7. The method of claim 6 wherein the step of orienting said stored sequence of staples so that said staples automatically advance to a lead position beneath a vertical actuator head of a staple gun due only to the force of gravity includes:

providing a central, upwardly curving arcuate portion of said feed track having first and second ends;

connecting an upwardly angled upper linear portion of said feed track to said first end of said central arcuate portion; and connecting a lower horizontal portion of said feed track to said second end of said central arcuate portion.

8. The method of claim 7 wherein the step of orienting said stored sequence of staples so that said staples automatically advance to a lead position beneath a vertical actuator head of a staple gun due only to the force of gravity, includes:

attaching said feed track to a horizontal base; and securing said staple gun to said horizontal base in a position straddling said feed track and causing said advancing staples to pass beneath said vertical actuator head.

9. A feed, discharge, and activation system for a plurality of fasteners, comprising:

a fastener discharge actuator for individually discharging and activating said plurality of fasteners;

a fastener feed track disposed beneath said actuator, said feed track further comprising:

a linear upper region adapted to be disposed in an upwardly angulated orientation permitting said plurality of fasteners to be mounted thereon in slidable engagement therewith;

an upwardly curving arcuate central region contiguous with said linear upper region; and a horizontal lower region contiguous with said upwardly curving arcuate region and disposed adjacent said actuator, said horizontal region facilitating the movement of said plurality of fasteners between said feed track and said actuator; and means connecting said feed track to said fastener discharge actuator.

10. The system of claim 9 wherein said fasteners are staples and said actuator is a staple gun.

11. The system of claim 10 wherein said feed track is formed for the receipt of staples thereon, said track being constructed with sidewalls sufficiently narrow to permit the free movement of said staples therealong and sufficiently wide to guide said staples thereupon.

12. A method of feeding staples to a staple actuator of the type wherein said actuator is positioned above said staples for engagement of individual ones thereof and the discharge of and activation of said staples therefrom, said method comprising the steps of:

forming a staple feed track having a lower horizontal portion, a central upwardly curving arcuate portion, an upwardly angled linear upper portion, and a width adapted for receiving racks of staples thereupon in slidable engagement therewith;

mounting a means for retaining said staples on said feed track during the movement of said staples therealong;

securing said staple actuator to said feed track; and loading staples onto said feed track in sufficient quantity to permit a plurality of staples to extend upwardly along said upwardly angled linear portion, thereby utilizing the pull of gravity to urge said staples disposed in the lower horizontal portion of said feed track to move beneath said actuator.

13. The method of claim 12 wherein the step of forming said staple feed track includes constructing said feed track with a beveled staple feed surface sized to permit staples to slide therealong in slip-fit engagement therewith.

14. The method of claim 13 wherein the step of mounting a means for retaining said staples on said feed track includes the steps of:

providing a guard rail; and disposing said guard rail above said upwardly curving arcuate portion and above said upwardly angled linear portion a sufficient distance to facilitate the passage of staples therebeneath while maintaining the passage of staples on said feed track.

15. A method of feeding, discharging, and activating fastening elements, comprising the steps of:

providing a fastener discharge actuator for discharging and activating said fastening elements;

providing an arcuate track for receipt of said fastener elements thereupon, at least a portion of said track extending upwardly relative to said actuator;

providing means for securing said actuator to a portion of said track for the engagement of said fastening elements therebeneath;

loading a sufficient quantity of said fastening elements on said track for permitting said fastening elements to be disposed on said upwardly extending portion thereof, and to be pulled under the force of gravity to thereby urge said fastening elements to move beneath said actuator; and actuating said fastener discharge actuator to discharge and activate one of said fastening elements.

16. An improved stapling system of a type wherein individual ones of a series of staples are discharged for penetration of members contiguous thereto, wherein the improvement comprises:

a staple discharge actuator;

a gravity-flow staple feed system coupled to, and at least partially disposed within, said staple discharge actuator, said feed system comprising:

an arcuate feed track positioned adjacent said staple discharge actuator and extending outwardly and upwardly therefrom in an arcuate configuration of sufficient length to permit the pull of gravity, on staples loaded on said feed track, to apply a sufficient force to said staples for pushing said staples through said staple discharge actuator;

means supporting said feed track adjacent to and in association with said staple discharge actuator; and means for receiving staples onto said track.

17. The stapling system of claim 16 wherein said track is constructed from a curved frame member having a beveled staple feed surface sized to permit staples to slide therealong in slip fit engagement therewith.

18. The stapling system of claim 17 further comprising a bracket disposed outwardly from said curved frame member and spaced therefrom a sufficient distance to permit the passage of staples therebeneath, while maintaining the passage of staples on said frame member.

19. The stapling system of claim 16 further comprising means for securing said staple discharge actuator to a lower region of said track for positioning said actuator above said staples for the engagement and discharge thereof.

20. An improved stapling system of a type wherein a staple actuator engages individual ones of a series of staples and discharges said staples for penetration of members contiguous thereto, wherein the improvement comprises:

a gravity-flow staple feed system coupled to, and at least partially disposed within., said staple actuator, said feed system comprising:

an arcuate feed track positioned adjacent said staple actuator and extending outwardly and upwardly therefrom in an arcuate configuration of sufficient length to permit the pull of gravity, on staples loaded on said feed track, to apply a sufficient force to said staples for pushing said staples through said staple actuator;

means supporting said feed track adjacent to and in association with said staple actuator; and means for receiving staples onto said track; and means for securing said staple actuator to a lower region of said track for positioning said actuator above said staples for the engagement and discharge thereof, wherein said actuator securement means includes a locking clamp assembly mounted on said track supporting means and adapted to engage said actuator.

21. The stapling system of claim 16 wherein said arcuate track comprises a segment having a radius on the order of fifteen inches.

22. The system of claim 3 wherein the means for positioning said staple gun so that said lead position of said advancing sequence of staples is a position beneath said vertical actuator head of said horizontally disposed staple gun includes:

a horizontal base to which said feed track is attached; and a clamp assembly for securing said staple gun to said horizontal base in a position straddling said feed track and causing said advancing staples to pass beneath said vertical actuator head.

23. The stapling system of claim 19 wherein said means for securing said staple discharge actuator includes a locking clamp assembly mounted on said track supporting means and adapted to engage said staple discharge actuator.

* * * * *

UNITED STATES PATENT AND TRADEMARK OFFICE
CERTIFICATE OF CORRECTION

PATENT NO. : 5,415,318
DATED : May 16, 1995
INVENTOR(S) : MARLAN M. LEWIS

It is certified that error appears in the above-indentified patent and that said Letters Patent is hereby corrected as shown below:

| | |
|---|---|
| Title Page, Item [56], Attorney, Agent, or Firm | Delete "Jenkins"<br>Insert --Jenkens-- |
| Column 5, line 56 | Delete "in-board"<br>Insert --inboard-- |
| Column 6, line 38 | After "claimed"<br>Insert --is:-- |
| Column 10, line 4 | After "within"<br>Delete "." |

Signed and Sealed this

Twenty-sixth Day of December, 1995

Attest:

BRUCE LEHMAN

Attesting Officer

*Commissioner of Patents and Trademarks*